United States Patent [19]

Derksen

[11] Patent Number: 5,478,993
[45] Date of Patent: Dec. 26, 1995

[54] PROCESS AS SAFETY CONCEPT AGAINST UNAUTHORIZED USE OF A PAYMENT INSTRUMENT IN CASHLESS PAYMENT AT PAYMENT SITES

[75] Inventor: Eduard Derksen, Hinterfultigen, Switzerland

[73] Assignee: Ascom Autelca AG., Gümligen, Switzerland

[21] Appl. No.: 181,891

[22] Filed: Jan. 18, 1994

[30] Foreign Application Priority Data

Jan. 18, 1993 [CH] Switzerland ............... 136/93

[51] Int. Cl.⁶ .................................. G06K 5/00
[52] U.S. Cl. ................. 235/380; 902/5; 902/27
[58] Field of Search ................ 235/380, 381; 902/27, 28, 5

[56] References Cited

U.S. PATENT DOCUMENTS

| | | | |
|---|---|---|---|
| 4,001,550 | 1/1977 | Schatz | 235/379 |
| 4,375,032 | 2/1983 | Uchida | 235/381 |
| 4,442,345 | 4/1984 | Mollier et al. | 902/28 |
| 4,837,422 | 6/1989 | Dethloff et al. | 235/380 |
| 4,859,837 | 8/1989 | Halpern | |
| 4,963,722 | 10/1990 | Takeuchi | 235/381 |
| 5,227,612 | 7/1993 | Le Roux | |
| B14,001,550 | 12/1988 | Schatz | |

FOREIGN PATENT DOCUMENTS

| | | |
|---|---|---|
| 0232058 | 8/1987 | European Pat. Off. . |
| 0356121A3 | 2/1990 | European Pat. Off. . |
| 04056841 | 1/1991 | European Pat. Off. . |
| 0440549 | 8/1991 | European Pat. Off. . |
| 2503423 | 10/1982 | France . |
| 1556241 | 11/1979 | United Kingdom ............ 902/28 |
| 2191029 | 12/1987 | United Kingdom . |

*Primary Examiner*—F. L. Evans
*Attorney, Agent, or Firm*—Brady, O'Boyle & Gates

[57] ABSTRACT

The process provides a staggered degree of security as a safety concept against unauthorized use of a transaction card for purchasing of items. The card has four memories memorizing an amount of money, a money installment and its limiting value, a number of usable transactions and its limiting value, further data for doing an identity check of the ownership of the cardholder and also an authenticity check. The card is usable at three different types of payment instruments with or without an identity check and/or an authenticity check.

9 Claims, 4 Drawing Sheets

PROCESS AS SAFETY CONCEPT AGAINST UNAUTHORIZED USE OF A PAYMENT INSTRUMENT IN CASHLESS PAYMENT AT PAYMENT SITES

BACKGROUND OF THE INVENTION

The invention relates to a process as a safety concept against unauthorized use of a payment instrument in cashless payment at payment sites, an arrangement with several payment sites and a payment instrument therefor.

Services are defined among others as tickets for use of a train, bus or aircraft, etc., admission tickets for museums, theater performances, etc., as well as dispensing of cash. Purchases of goods are defined on the one hand as purchase of goods which have been selected in a business, and on the other hand goods dispensed directly by a vending machine, for example, candy, beverages, newspapers, food, and all types of movable products which do not exceed certain dimensions dictated by the vending machine. The vending machine contains a payment site for cashless payment for purchase of goods.

Depending on the application, there have been the most varied payment sites, as, for example, on vending machines for buying tickets for public transport, for payment of an amount in purchase of goods at a cashier's in a store, etc. Small amounts were paid at payment sites using a prepaid cashless payment instrument, generally a card-shaped article with computer-readable information and/or an installed chip. Larger amounts were paid generally by means of a debit, credit or customer charge card which likewise contained computer-readable information.

If the equivalent value to be paid, for example, for a subway or bus ride, was small, prepaid cashless payment instruments were made such that admittedly their counterfeiting represented a certain effort; however, unauthorized use by anyone, whether by a dishonest finder or a thief, was possible. If, for example, cash was to be procured or goods of higher value were to be purchased, generally possession of a cashless payment instrument was not adequate for purchase of goods; in addition, for example, a PIN code had to be typed into the keyboard of the payment site as an authorization check for holder identification, in which, depending on the security level, there would also be an "inquiry" (on-line authentication) at the account holding institution, in a stop list, a positive file, etc., by the payment site.

Depending on the type and value of the goods and/or services purchased or to be purchased, the customer required several cashless payment instruments.

SUMMARY OF THE INVENTION

Here the invention is designed to afford relief and reduce the number of cashless payment instruments to be used to pay for purchase of goods and/or services and the number of their pertinent payment site arrangements while providing a staggered degree of security as a safety concept. Staggering is done preferably according to the level of risk for the holder of the cashless payment instrument, in which there are payment sites appropriately designed for this purpose.

In the figurative sense, the cashless payment instrument used in the process according to the invention with the arrangement according to the invention can be regarded in a first approximation as a purse which has at least two separate money compartments, in which the first compartment contains a large amount at risk, for example CHF 500, and the second compartment contains a small amount at risk, for example CHF 50. The second compartment can at this point be opened n times to withdraw money. Withdrawal of money (n+1) times is only possible again when the holder of the payment instrument is identified, for example by inputting a PIN code or biometric authenticity feature (fingerprint, signature, voice recognition feature, etc.) at a corresponding payment site. After identification, "access" is again possible n times.

When, however, the second money compartment with the small amount at risk is empty, likewise no further access is possible, even if it has been opened less than n times. At this point identification must likewise now take place, as described above, and in addition an on-line authenticity check of the payment instrument, for example, by an inquiry at a control unit in which invalid (stolen, lost, overdrawn . . . ) payment instruments are stored.

In the invention, the amount of money disbursed is only ever withdrawn from a single amount which is drawn on the account and which is actually always fully available to the holder of the payment instrument.

This amount can be withdrawn only in an on-line payment site directly from the account of the payment instrument holder (charging of the payment instrument), in which a withdrawal is made only with a check of the identity of the payment instrument holder and the authenticity of the payment instrument. Preferably, at the same time as the withdrawal, this amount will be credited on the pool account of the payment instrument issuer(s) or a service or establishment which offers goods. A pool is defined as a combination of companies, establishments, etc. which settle jointly for the goods or services purchased from them. The amount credited by withdrawal from the pool account on the payment instrument is then, as indicated above, used up by a series of partial amounts for purchase of goods and services, for example, using public transport, eating in certain restaurants, etc.

In order to prevent being suddenly left with an empty "purse", preferably so-called advance warning values are stored which deliver a message when, for example, 10 to 20% of the maximum possible number of payment site uses can still be performed or 10 to 20% of the maximum possible amount at risk are still available. Then the payment instrument can be recharged or additional payment site utilization procedures (initial value) or an initial value of the amount at risk can be enabled in due time.

The advance warning value need not necessarily be stored on the payment instrument; it can be stored in the payment site and can also vary from payment site to payment site. The amount at risk can be handled similarly.

Since for accounting reasons the aforementioned "purse" can only be charged for use for one pool at a time, it is advantageous to install several separate storage systems on the payment instruments which are reserved for different pool systems. The pool can be identified by a stored feature on the payment instrument, possibly combined with separate cryptographic keys.

At this point, since the identification data needed for refreshing and borrowing are already stored, charging can take place with the payment instrument at a certain payment site directly from the account (with authentication). Since account transactions entail relatively high processing costs, this procedure is used only for relatively large amounts of money and the aforementioned "purse procedure" is used with the safety concept for smaller amounts of money, where on-line authentication is not justified for reasons of cost.

On-line authentication of the payment instrument always takes place when a risk threshold is exceeded from the point of view of the payment instrument holder.

Instead of making the identity or authentication check dependent only on the processing costs, the time interval necessary for the check can also be used. In procedures which generally take place quickly, as for example acquisition of a train ticket (if the check were lengthier, the train may already have left), an amount which is high relative to the processing costs can also be debited without checking. The decision-making systems necessary for this purpose can be installed in the pertinent payment site, for which the amount at risk is then automatically increased to advantage.

Preferably, messages for the payment instrument holder can be stored on the payment instrument. Example of stored messages are reminders of periodically recurring payments or the like. Also new messages can be freshly stored at any one time on the payment instrument upon contact with the bank as the result of money withdrawal from the account. If the reminders or payments stored in this manner are not executed, the payment instrument holder is reminded of his payment obligations. After the payment instruction is executed, the payment reminder is erased.

The advantage of the process as a safety concept consists in that only a few account transactions which generate processing costs are carried out for large amounts of money and small amounts are debited directly from the payment instrument in a cost-neutral manner at the level of these processing costs. When these small amounts are disbursed, the maximum risk of the payment instrument holder relative to illegalities is limited by the stipulated number of payment site uses without identification or by using up a stipulated amount at risk without on-line authentication. Preferably at this point, the number of payment site uses without identification is refreshed only by a cost-neutral identity check, for example, even on a terminal without host contact, and the available amount of money is refreshed by a reduced-cost on-line authenticity check with host contact only, for example, on a stop list. Thus, cashless purchases of goods and services with small safety risk and with low processing costs are possible.

In the following, examples of the arrangement and payment instrument according to the invention are detailed using drawings.

DESCRIPTION OF THE PREFERRED EMBODIMENTS

Figure 1:
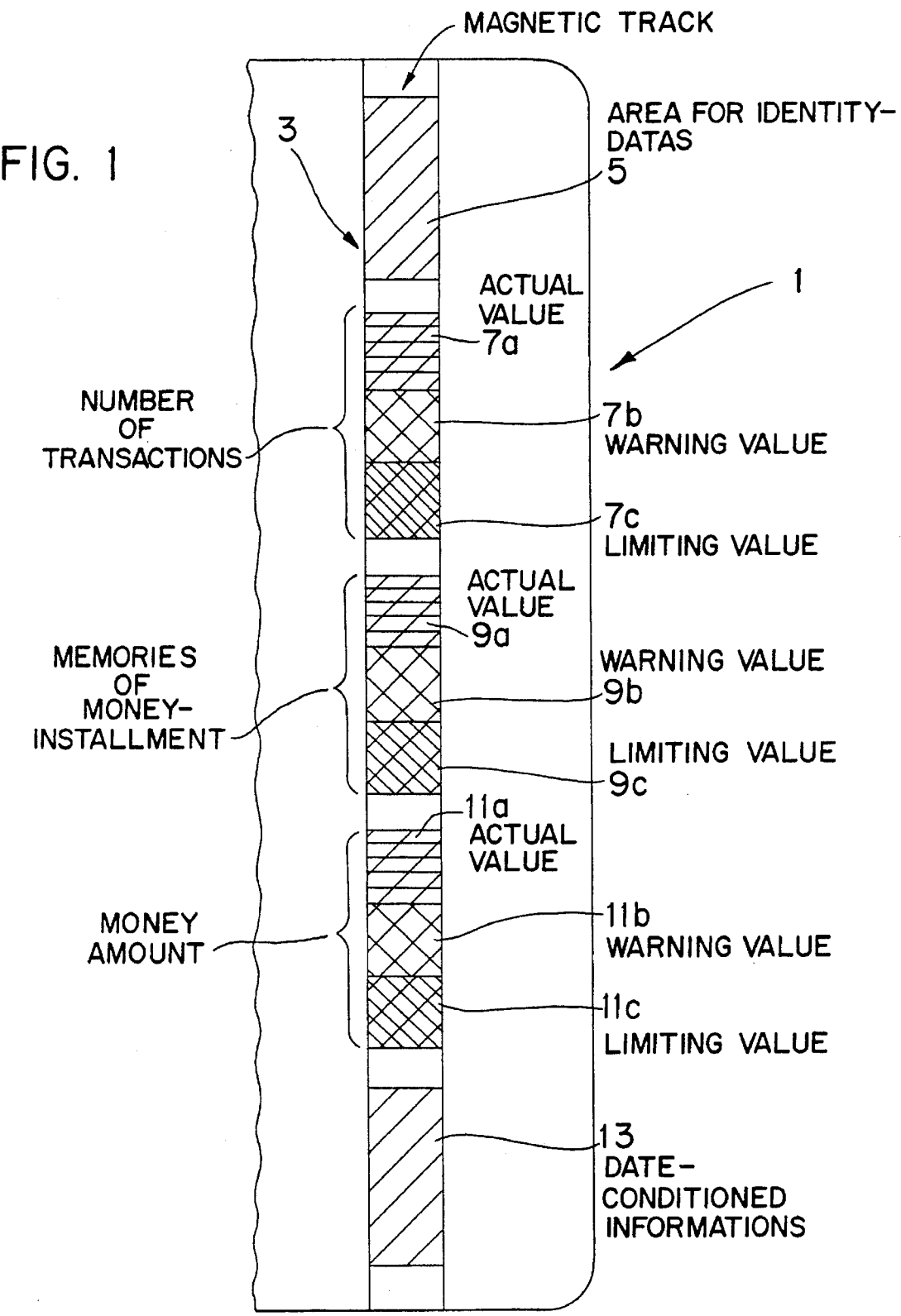
FIG. 1 shows a schematic of a cashless payment instrument in card form.

The handy payment instrument 1 in card form shown in FIG. 1 can have several successive magnetic tracks, for which only one is shown with reference number 3. Similarly, the same system applies to other card technologies, for which they can have several independent memories if necessary.

On magnetic track 3 there are several storage cells designed as memory areas. The arrangement of memory areas should only be regarded as symbolic and has nothing to do with the actual location. The following memory areas are present:

- a memory area 5, in which identity data such as the code of the bank which keeps the account, general credit limits, data for processing of holder identification, for example, as the result of inputting a PIN code using the keyboard of a payment site, are stored;

- a memory area 7 with an initial value 7a, an advance warning value 7b and a final value 7c for a number of uses of payment sites without PIN input, in which the final value 7c can also be a parameter of the pertinent payment site;

- a memory area 9 with an amount at risk 9a, an advance warning amount at risk 9b, and a final amount at risk 9c, in which the final amount 9c can also be a parameter of the pertinent payment site;

- a memory area 11 with an instantaneous actual amount of money 11a, a reserve amount (advance warning value) 11b (when it is reached the payment instrument holder is requested by the terminal to recharge it in order not to be "unable to pay"), and a minimum amount of money 11c which must be maintained; and

- a memory area 13 in which reminder messages and/or the like can be stored for the payment instrument holder, in which the payment site reminds the payment instrument holder when he is not satisfying his obligations.

Figure 2:
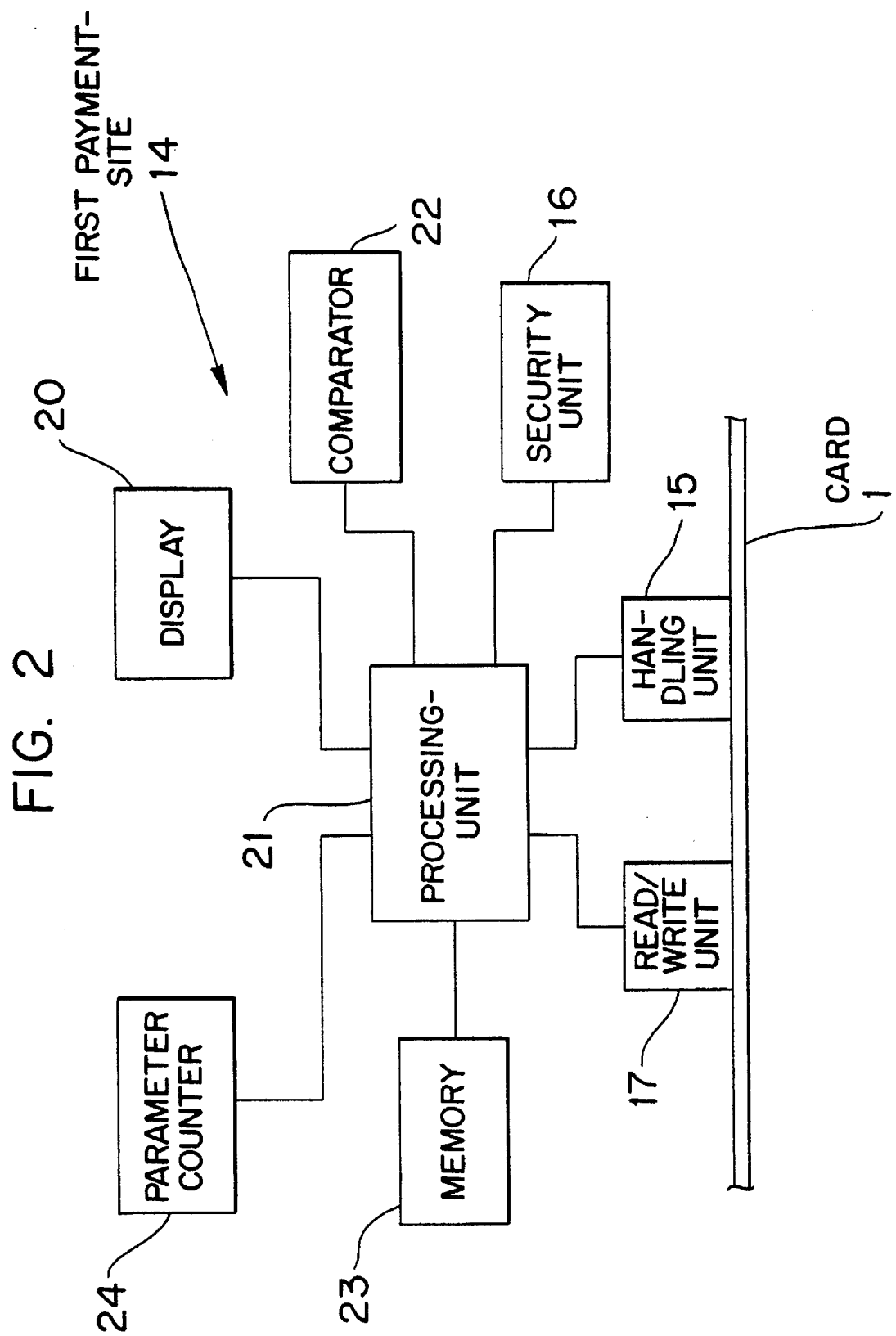
FIG. 2 shows block diagram of a first payment site of an arrangement of payment sites.

The first payment site 14 shown in FIG. 2 is used to pay for purchase of services in particular, such as a pass on public transport, for road and bridge tolls, admission tickets, etc., i.e., for paying smaller amounts of the same magnitude as processing costs for account transactions. Payment site 14 has the following logical units:

- 15 a mechanical acceptance unit for the payment instrument or another unit which enables dialog with the payment instrument 1;

- 16 a security unit which enables off-line authentication of the payment instrument 1 (option);

- 17 a read/write unit with which information can be read from the payment instrument 1 or written into it;

- 20 a display unit (option);

- 21 a processing unit;

- 22 a comparison unit;

- 23 a memory; and

- 24 a parameter counter.

Payment site 14, however, has no keyboard for inputting a PIN code, nor a communications device to a host, like the second and third payment sites described below. With the first payment site 14, after reading data 7a, 7b, 7c, 9a, 9b, 9c, 11a, 11b and 11c:

- in memory area 7 the initial value 7a can be queried and changed and compared with the advance warning value 7b and the final value 7c by the processing unit 21, with buffering in the memory 23 and comparison with comparison unit 22, and the new initial value 7a can be determined and stored again;

- in memory area 9, the amount at risk 9a can be queried and changed and compared with the advance warning amount at risk 9b and the final amount at risk 9c, and the new amount at risk 9a increased by the value of the goods or service purchase can be determined and stored again;

- in memory area 11, the amount of money 11a can be queried and changed and compared with the reserve amount (advance warning value) 11b and the minimum amount of money 11c, and the new amount of money 11a reduced by the amount of purchase of goods or services can be determined and stored again.

These sequences in memory areas 7, 9 and 11 will be detailed by the following table:

The payment instrument 1 has an amount of money 11a of CHF 500, for example, which was charged onto it according to one of the processes described below, and a risk value of CHF 0, for example, and the initial value 7a of 0, for example. The advance warning values 7b, 9b and 11b are 7, CHF 50 and CHF 40, and the final value 7c is 10, 9c is CHF 5 and 11c is CHF 0. Instead of Swiss francs, amounts of other currencies as well as fractions thereof can of course also be used. The memory states are as follows:

| Memory area | 11 | 9 | 7 |
|---|---|---|---|
| a | 500 | 0 | 0 |
| b | 50 | 40 | 7 |
| c | 0 | 50 | 10 |

At this point a ticket for CHF 3 is purchased using payment instrument 1, whereupon the memory states are as follows:

| Memory area | 11 | 9 | 7 |
|---|---|---|---|
| a | 497 | 3 | 1 |
| b | 50 | 40 | 7 |
| c | 0 | 50 | 10 |

If, proceeding from this memory state, another seven tickets with a total amount of CHF 15 are purchased with payment instrument 1, the states are as follows, for which in the left hand table the initial state and in the right hand table the new state are shown:

| Initial state | | | | New state | | | |
|---|---|---|---|---|---|---|---|
| Memory area | 11 | 9 | 7 | Memory area | 11 | 9 | 7 |
| a | 497 | 3 | 1 | a | 482 | 18 | 8 |
| b | 50 | 40 | 7 | b | 50 | 40 | 7 |
| c | 0 | 50 | 10 | c | 0 | 50 | 10 |

Since the advance warning value 7b was exceeded, a message is delivered from the display unit 20 (if present). This message requires the payment instrument holder to go to a second or third payment site described below in order to enable a new initial value 7a (value 0) on the payment instrument 1 after identification.

If, based on the original memory state on payment instrument 1 described below, six tickets with a total amount of CHF 39 are purchased, the states are as follows:

| Initial state | | | | New state | | | |
|---|---|---|---|---|---|---|---|
| Memory area | 11 | 9 | 7 | Memory area | 11 | 9 | 7 |
| a | 497 | 3 | 1 | a | 458 | 42 | 7 |
| b | 50 | 40 | 7 | b | 50 | 40 | 7 |
| c | 0 | 50 | 10 | c | 0 | 50 | 10 |

Since the advance warning value 9b was exceeded, a message is delivered from the display unit 20 which requires the payment instrument holder to go to the second or third payment site described below in order to enable a new initial value 9a (value 0) on the payment instrument 1 after identification and/or authentication.

If, based on the original memory state on the payment instrument described below, a ticket for an amount of CHF 3 is purchased, the states are as follows:

| Initial state | | | | New state | | | |
|---|---|---|---|---|---|---|---|
| Memory area | 11 | 9 | 7 | Memory area | 11 | 9 | 7 |
| a | 465 | 35 | 10 | a | 462 | 38 | 11 |
| b | 50 | 40 | 7 | b | 50 | 40 | 7 |
| c | 0 | 50 | 10 | c | 0 | 50 | 10 |

Since purchase of this ticket would have caused the final value 7c to drop below the threshold, the purchase is a priori not possible. The card holder must first enable the initial value 7a. The procedure is similar when value 9c and 11c are exceeded (if the payment site has a parameter which is higher than the value 10, payment can nevertheless take place according to the example).

As one version, goods and services of m pools which do not clear with one another can also be purchased with a single payment instrument 1 in which the storage cell 11 is managed m times as storage cells $11^1$, $11^2$, ..., $11^m$. In this process each pool manages its own counter 11, 9, and 7. However, as cited below, the m pools can administer the counters 9 and 7 jointly, as another version.

If, for example, at a first company two tickets for a total price of CHF 4 and at a second company two tickets for a total price of CHF 7 are purchased, based on the initial state shown below, the following states arise:

| Initial state | | | | | New state | | | | |
|---|---|---|---|---|---|---|---|---|---|
| Memory area | $11^1$ | $11^2$ | 9 | 7 | Memory area | $11^1$ | $11^2$ | 9 | 7 |
| a | 500 | 500 | 0 | 0 | a | 496 | 493 | 11 | 5 |
| b | 50 | 50 | 40 | 7 | b | 50 | 50 | 40 | 7 |
| c | 0 | 0 | 50 | 10 | c | 0 | 0 | 50 | 10 |

The advance warning values 7b, 9b and 11b as well as final values 7c, 9c and 11c are processed analogously to the aforementioned versions.

Figure 3:
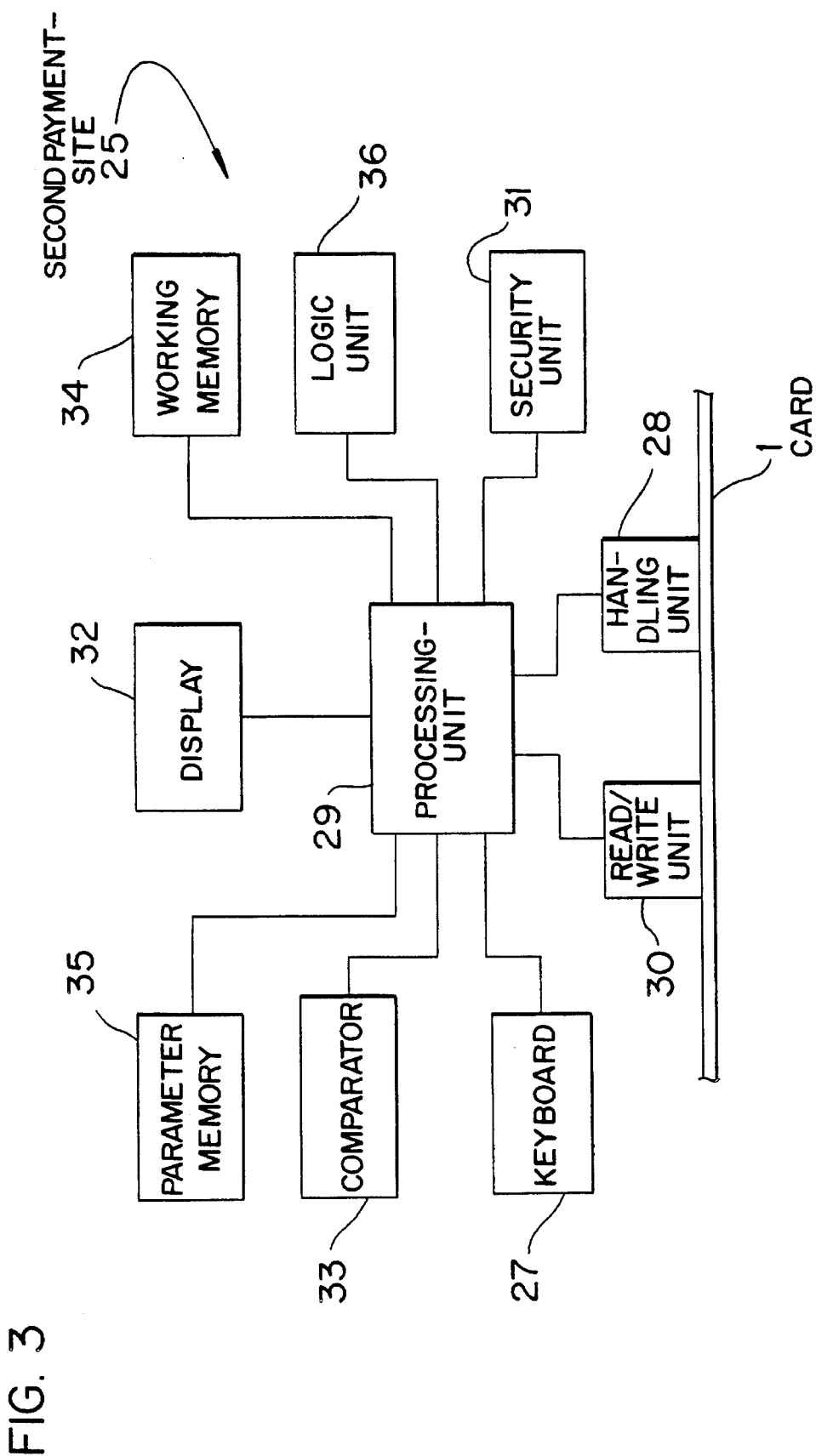
FIG. 3 shows a second payment site.

A second payment site 25 of the arrangement shown in FIG. 3 is likewise used for payments, especially for purchases of services, such as a pass on public transport, payment of road and bridge tolls, admission tickets, etc.; with it, however, the initial value 7a can be enabled again. The payment site 25 has the following logical units:

- 27 a PIN-keyboard or unit for a biometric identification process;
- 28 a mechanical acceptance unit for the payment instrument 1 or another unit which enables dialog with the payment instrument 1;
- 29 a processing unit;
- 30 a read/write unit with which information of the payment instrument 1 can be changed;
- 31 a security unit which enables off-line authentication of the payment instrument 1 (option);
- 32 a display unit;
- 33 a comparator unit;
- 34 a memory;
- 35 a parameter memory and 36 a logic unit for processing of identification features, for example, a PIN code.

The keyboard 27 is used to input a PIN code with which identity can be ascertained between the payment instrument 1 and the payment instrument holder operating the payment site 25. Since an authenticity check as provided at the third payment site 39 is not possible, the security standard is lower since the payment instrument 1 could have already been stolen, for example.

Figure 4:
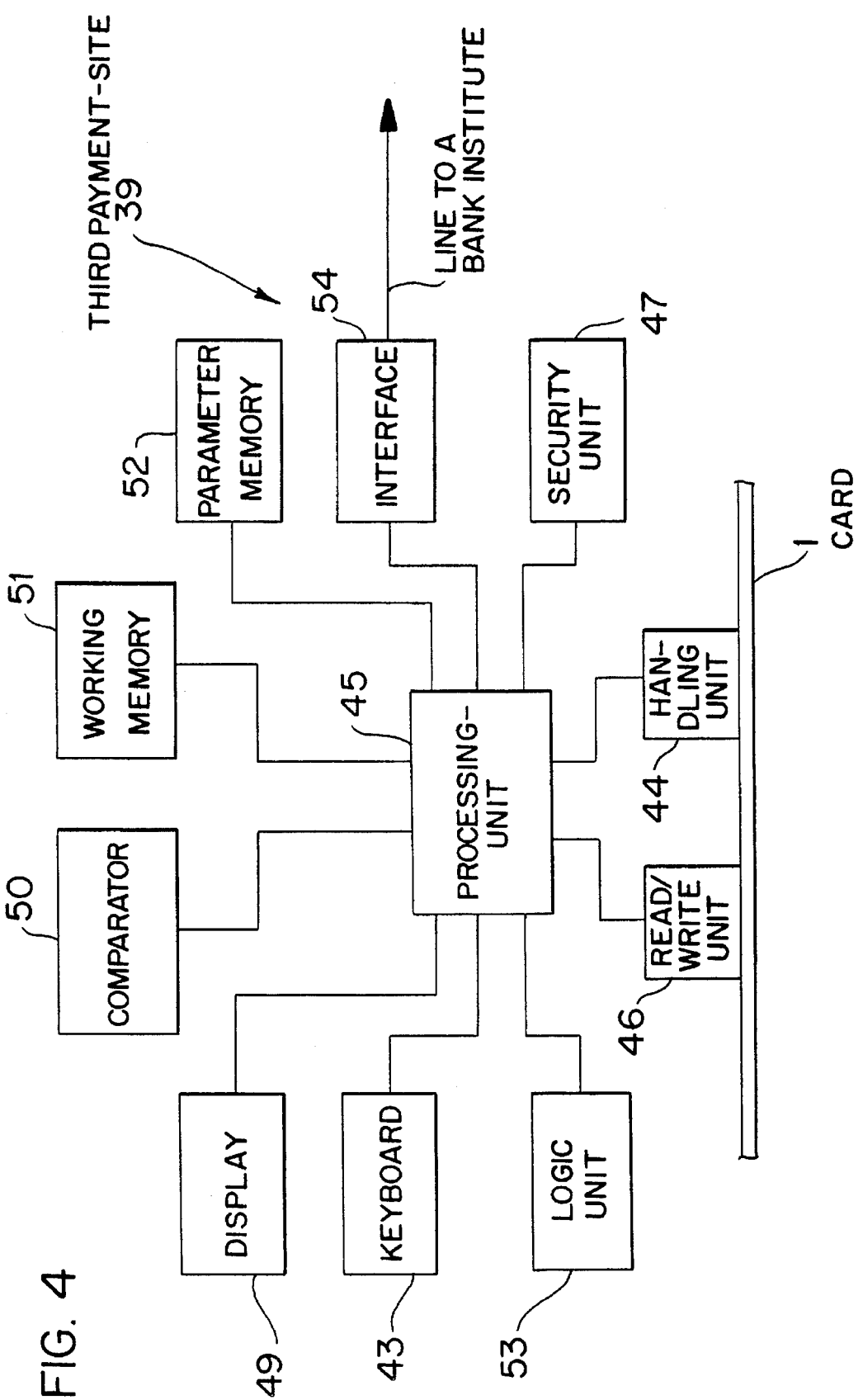
FIG. 4 shows a third payment site.

A third payment site 39 shown in FIG. 4, compared to the first and second payment sites 14 and 25, also has a communications interface by means of which it can establish contact directly with remote verification agencies of the payment system. The third payment site 39 can thus execute the following additional functions:

on-line authentication of payment instrument 1 by the remote verification agency 41 of the payment system which can correct the memory value 9a (for example, zero position after completed check, for example, of a stop list);

charging of the memory value 11a with an amount of money 11a which debits the account of the payment instrument holder; and direct debiting from the account of the payment instrument holder.

The payment site 39 is characterized by the fact that it can establish contact with one or several remote computers or verification agencies of the payment instrument system. It has the following logic units:

43 a PIN-keyboard or unit for a biometric identification process;

44 a mechanical acceptance unit for the payment instrument 1 or another unit which enables dialog with the payment instrument 1;

45 a processing unit;

46 a read/write unit with which information of the payment instrument 1 can be changed;

47 a security unit which enables off-line authentication of the payment instrument 1 (option);

49 a display unit;

50 a comparison unit;

51 a memory;

52 a parameter memory;

53 a logic unit for processing of identification features, for example, a PIN code; and 54 a communications interface with a transmission unit.

A maximum value can be loaded into memories 7a and 9a, from which the respective number of payment site uses or the amount just disbursed is deducted. Instead of the respective maximum value, a minimum value would then be loaded as a final value into memories 7c and 9c; the advance warning values stored in memories 7b and 9b are accordingly adjusted. That is, the advance warning values are exceeded here proceeding from higher values to lower values, while in the previous example they were exceeded from low values to higher values. Non-zero negative or positive values can also be used as values 7c, 9c and 11c; they enable control of PIN input and monitoring of the amount at risk at that instant.

Instead of a magnetic track 3, a chip with individual storage cells or other card technologies can be used.

Instead of designing the cashless payment instrument in card form, other formats can also be used. However, it should be considered that the item on the one hand should be easily available and manageable, therefore not too small, and on the other hand it should only be so large that it does not take up too much space and can be transported in the clothing of the payment site user without additional pockets. Instead of a card-shaped article, key-like articles can thus also be used, for example.

In addition to access control via a PIN code which is input into the pertinent payment site, access control can be installed directly on the payment instrument in which only a code transmitted from the first payment site to the payment instrument opens the storage cells. This can be done by circuitry, for example, using storage chips, or by storing encrypted data with a decryption code which arises only together with the data of the pertinent payment site and/or the input PIN code.

I claim:

1. A process with a staggered degree of security as a safety concept against unauthorized use of a transaction card (1) for purchasing of items, comprising memorizing an amount of money with a first memory (11) on the card, memorizing in a second memory (9) on the card a second value of an amount of a money installment and a limiting amount of said money installment, memorizing in a third memory (7) on the card a third value referring to the number of transactions done using said second memory (9) or a predetermined initial value and a limiting value of said number of transactions, memorizing in a fourth memory (5) on the card first information data of the card owner, using the transaction card at a first and a second payment site (14, 25), processing in a first processing step by reading said first information data from said transaction card (1) at said second payment site (25), the cardholder inserting second information data into said second payment site (25), processing said first and second information data off-line in said second payment site (25) for an identity check of the ownership of said cardholder, on receiving a positive result, transferring a predetermined value of said money installment from said amount in said first memory (11) as a second value to said second memory (9) and a predetermined initial value is set as a third value in said third memory (7), and said card (1) being rejected, on receiving a negative result, rejecting said card without transferring said money installment and without said pre-determined initial value, processing in a second processing step items being chosen, processing in a third processing step, at the first payment site (14) said card (1) without any identity check and without any authenticity check, calculating the payment amount of said items, and subtracting the calculated payment amount from said second value in said second memory (9), receiving a new second amount, and the value of the third memory (7) being changed by one giving a new third value, checking in a fourth processing step said new third value and said new second amount if exceeding said limiting amount of said money installment or said limiting value of said number of transaction, if not exceeding, memorizing said new second amount in said second memory (9) and said new third value in said third memory (7) in the place of the former second amount and the former second value, and setting free the said chosen items, if exceeding, rejecting said card (1) without setting free said items.

2. A process according to claim 1, using a third payment site (39), processing in a fifth processing step before the first processing step an authenticity check of said card at said third payment site (39) for memorizing said amount in said first memory (11), there the authenticity check is done including making the identity check by an on-line-check of the account of the card owner at his Bank/Institute.

3. A process according to claim 1, including storing first, second, and third warning values respectively into said first, second and third memories (11, 9, 7), wherein, using said second payment site (25), checking in a fifth processing step if said value in said second memory (9) and said value in said third memory (7) are respectively exceeding said second or said third warning value, checking in a sixth processing step if the amount in said first memory (11) is exceeding said first warning value by using said first payment site (14), upon receiving an exceeding amount of said first, second or third warning value, emitting a warning signal at said first and said second payment site (14, 25), respectively.

4. A process according to claim 2, including a fifth memory (13) on the card (1), after conducting the authenticity check at said third payment site (39), reading date-conditioned payment obligations stored in said fifth memory (13) of the card (1), transferring said date-conditioned payment obligations to the Bank/Institute, the Bank/Institute determining if said date-conditioned payment obligations are satisfied, transferring back to said third payment site (39) the date-conditioned payment obligations that are not satisfied, storing a reminder on the card of the cardholder requiring payments by a stipulated deadline, and also transferring back to said third payment site (39) information of the satisfied date-conditioned payment obligations and erasing the satisfied date-conditioned payment obligations from said fifth memory (13).

5. A system for cashless payment with a staggered degree of security as a safety concept against unauthorized use of a transaction card (1) for purchasing of items, comprising said card (1) having a first memory (11) with an amount of money entered therein, a second memory (9) on said card with a money installment value and a limiting installment value entered therein, a third memory (7) on said card with an integral value indicating the number of possible purchasing events and a limiting integral value entered therein, a fourth memory (5) on said card with first information data for identifying the card owner, said system having a first payment site (14) with memory means (23) for a payment amount of purchased items, first read/write means (17) for reading said installment value in said second memory (9), a first comparator (22), and a first data processing unit (21) for processing said installment value from said read/write means with said payment amount from said memory means for obtaining a new amount and changing the integral value by one for obtaining a new integral value, and storing said new amount and said new integral value into said second and said third memories (9, 7) respectively, on said card if calculated by said comparator (22) they do not surpass said limiting installment value or said limiting money integral value, said system having a second payment site (25) with second read/write means (30) for reading the data of the first to fourth memories (11, 9, 7, 5) and writing in new data, with a second data processing unit (29, 33–36), and with second input means (27) for the card owner to enter in second information data, said second data processing unit (29, 33–36) processing off-line said first and said second information data for identifying the cardholder as card owner only by obtaining confirmation, then transferring a predetermined money installment value from said first memory (11) to said second memory (9) and setting said integral value of said third memory (7) to an initial value.

6. A system according to claim 5, including a third payment site (39), said third payment site (39) having a line connection (54) to a Bank/Institute, said third payment site having third read/write means (46) for reading the data of the first to fourth memories (11, 9, 7, 5) and writing in new data, a third data processing unit (45, 47, 49, 50–53), and third input means (43) for the card owner to enter in his second information data for identifying himself and authenticating himself by checking on-line memorized data of himself in the Bank/Institute, and if obtaining confirmation, transferring a predetermined amount to the first memory (11).

7. A system according to claim 6, wherein said third payment site (39) also having the equivalent equipment of said second payment site (25) for executing all processes of said second payment site (25).

8. A system according to claim 5, wherein said second payment site (25) also having the equivalent equipment of said first payment site (14) for executing additionally all processes of said first payment site (25).

9. A system according to claim 6, wherein said first, second, and third payment sites (14, 25, 39) are processable by only said one transaction card (1).

* * * * *